United States Patent
Shah et al.

(10) Patent No.: US 12,474,910 B2
(45) Date of Patent: Nov. 18, 2025

(54) MULTI-VARIANT IMAGE CONTAINER WITH OPTIONAL TAGGING

(71) Applicant: International Business Machines Corporation, Armonk, NY (US)

(72) Inventors: Amar Shah, Pune (IN); Akash Chandra, Bengaluru (IN); Prashant Farkya, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 18/088,664

(22) Filed: Dec. 26, 2022

(65) Prior Publication Data

US 2024/0211231 A1    Jun. 27, 2024

(51) Int. Cl.
G06F 8/61     (2018.01)
G06F 9/455    (2018.01)

(52) U.S. Cl.
CPC ............ G06F 8/63 (2013.01); G06F 9/45558 (2013.01); *G06F 2009/45562* (2013.01)

(58) Field of Classification Search
CPC ................. G06F 8/63; G06F 9/45558; G06F 2009/45562
See application file for complete search history.

(56) References Cited

U.S. PATENT DOCUMENTS

| | | | |
|---|---|---|---|
| 10,528,337 B1 | 1/2020 | Kannan | |
| 10,719,345 B2 | 7/2020 | Du et al. | |
| 10,754,976 B2* | 8/2020 | Aistrope | G06F 21/6209 |
| 10,908,887 B2* | 2/2021 | Bhat | G06F 8/63 |
| 11,029,975 B2 | 6/2021 | Prasad et al. | |
| 2017/0180346 A1* | 6/2017 | Suarez | G06F 9/45558 |
| 2019/0354389 A1* | 11/2019 | Du | G06F 9/45545 |
| 2020/0159536 A1* | 5/2020 | Saidi | G06F 9/45558 |
| 2023/0418594 A1* | 12/2023 | Griffin | G06F 8/71 |

FOREIGN PATENT DOCUMENTS

CN        114327754 A      4/2022

OTHER PUBLICATIONS

"https://docs.docker.com/reference/glossary/" (Year: 2019).*
Anonymous, Docker layer share by tag, ip.com, IP.com No. IPCOM000258170D, IP.com Electronic Publication Date: Apr. 16, 2019IP.

* cited by examiner

*Primary Examiner* — Wei Y Zhen
*Assistant Examiner* — Vivian Weijia Duan
(74) *Attorney, Agent, or Firm* — CHIP LAW GROUP

(57) ABSTRACT

An example operation may include one or more of receiving a request to build an instance of a container image that comprises a plurality of image layers, wherein the request comprises a tag identifier, creating the container image comprising the plurality of image layers, identifying a subset of image layers from among the plurality of image layers within the container image to exclude based on the tag identifier, and pulling remaining image layers from the container image with the subset of image layers excluded therefrom to an instance of a container deployed in a runtime environment.

9 Claims, 12 Drawing Sheets

FIG. 4C

Build File 440

FROM ubuntu
RUN cmd
COPY Core Feature
OPTIONAL (TAG: A, TAG: D) Copy feature – 1   448a
OPTIONAL (TAG: B) Copy feature – 2
OPTIONAL (TAG: C, TAG: D) Copy feature – 3   448b
CMD run 442
444
446

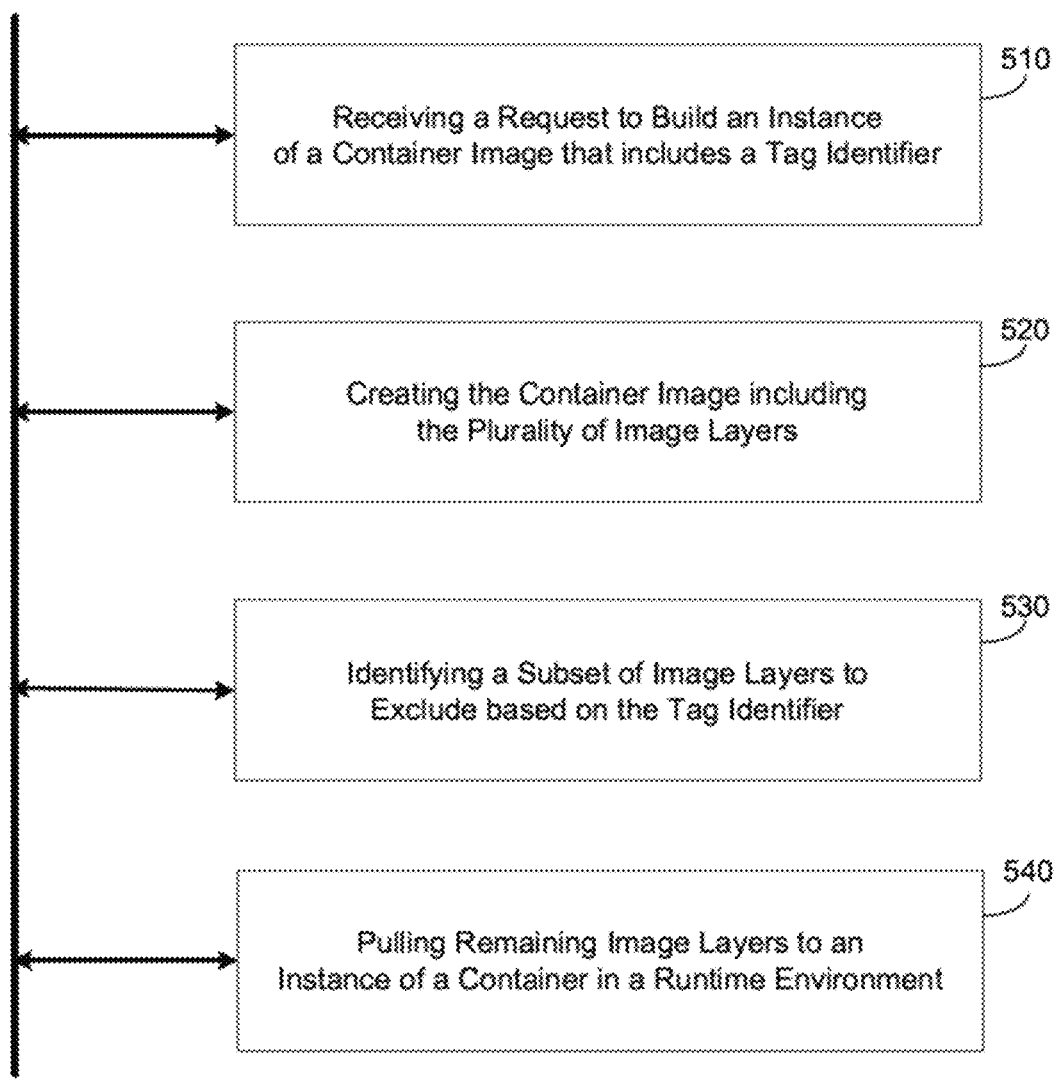

MULTI-VARIANT IMAGE CONTAINER WITH OPTIONAL TAGGING

BACKGROUND

A container is a package that provides an isolated execution environment where one or more processes can run in isolation. A container is a running instance of a container image which may be stored in a repository and accessed to obtain a copy of the image and deploy an instance of the application within a container by executing the container image. During a deployment of the container image, every layer is run resulting in a build of the entire container image which can take a significant amount of time.

SUMMARY

One example embodiment provides an apparatus that includes a processor that may be configured to receive a request to build an instance of a container image that comprises a plurality of image layers. The request may include a tag identifier. The processor may create the container image comprising the plurality of image layers and identify a subset of image layers from among the plurality of image layers within the container image to exclude based on the tag identifier. The processor may pull remaining image layers from the container image with the subset of image layers excluded therefrom to an instance of a container deployed in a runtime environment.

In an optional embodiment, the container image may include a build file that identifies one or more image layers within the container image that are optional and one or more tag identifiers assigned to the one or more image layers, respectively.

In another optional embodiment, the processor may compile the build file to identify which image layers within the container image are optional and tag identifiers assigned to the image layers which are optional, respectively.

Another example embodiment provides a method that may include receiving a request to build an instance of a container image that comprises a plurality of image layers, where the request includes a tag identifier. The method may include creating the container image comprising the plurality of image layers. The method may include identifying a subset of image layers from among the plurality of image layers within the container image to exclude based on the tag identifier. The method may also include pulling remaining image layers from the container image with the subset of image layers excluded therefrom to an instance of a container deployed in a runtime environment.

In an optional embodiment, the container image may include one or more image layers within the container image that are optional and one or more tag identifiers assigned to the one or more image layers within a build file, respectively.

In another optional embodiment, the method may further include compiling the build file to identify which image layers within the container image are optional and tag identifiers assigned to the image layers which are optional, respectively.

A further example embodiment provides a computer-readable medium comprising instructions, that when read by a processor, cause the processor to perform receiving a request to build an instance of a container image that comprises a plurality of image layers, where the request includes a tag identifier. The processor may further perform creating the container image comprising the plurality of image layers. The processor may further perform identifying a subset of image layers from among the plurality of image layers within the container image to exclude based on the tag identifier. The processor may further perform pulling remaining image layers from the container image with the subset of image layers excluded therefrom to an instance of a container deployed in a runtime environment.

In an optional embodiment, the container image may include one or more image layers within the container image that are optional and one or more tag identifiers assigned to the one or more image layers within a build file, respectively.

In another optional embodiment, the processor may further perform compiling the build file to identify which image layers within the container image are optional and tag identifiers assigned to the image layers which are optional, respectively.

BRIEF DESCRIPTION OF THE DRAWINGS

FIG. 4C is a diagram illustrating another example of a build file of a container image, according to example embodiments.

FIG. 5 is a diagram illustrating a method of building an instance of a container image with one or more optional layers removed, according to example embodiments.

DETAILED DESCRIPTION

It is to be understood that although this disclosure includes a detailed description of cloud computing, implementation of the teachings recited herein is not limited to a cloud computing environment. Rather, embodiments of the present application are capable of being implemented in conjunction with any other type of computing environment now known or later developed.

Figure 1:
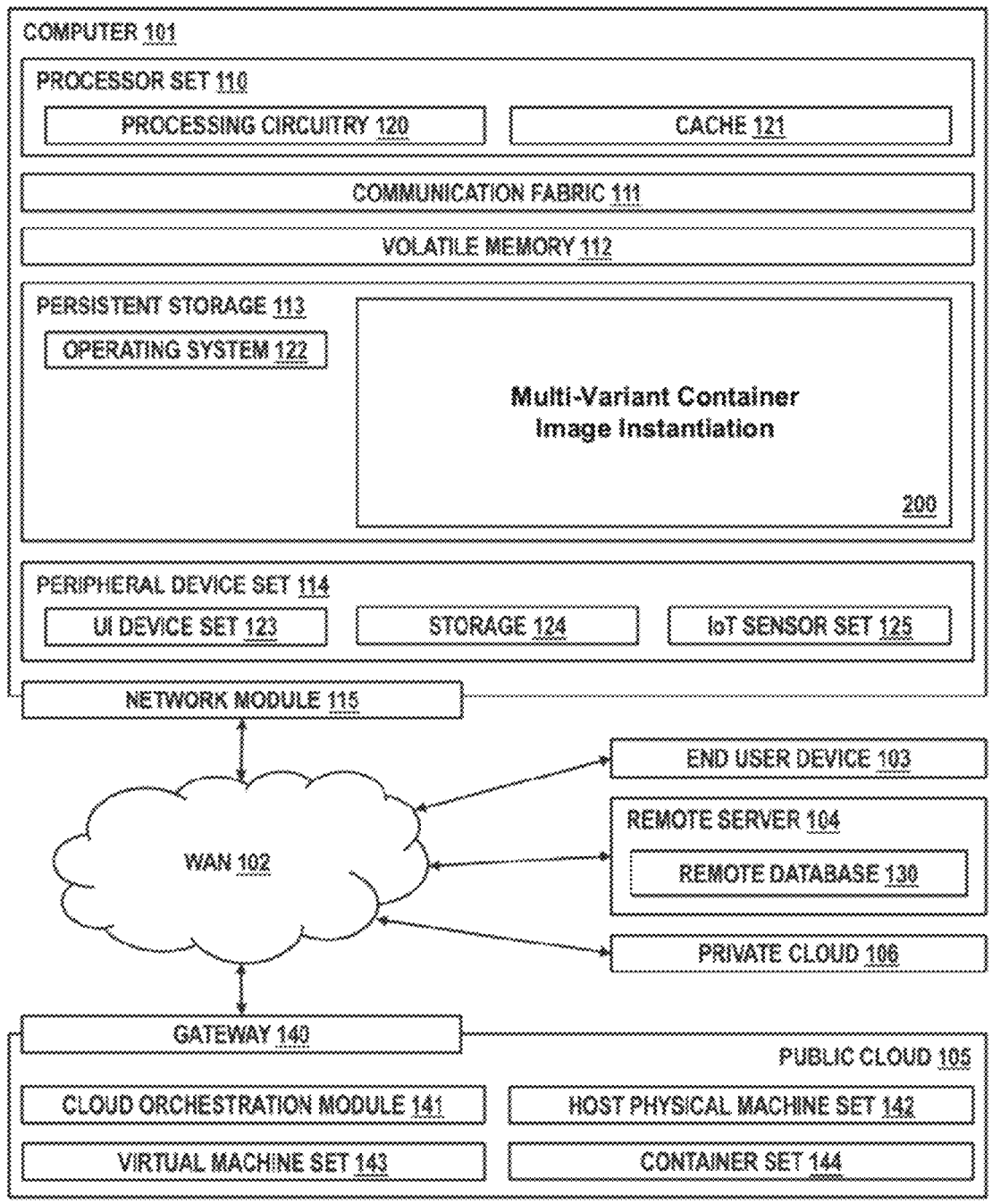
FIG. 1 is a diagram illustrating a computing environment, according to example embodiments.

Referring now to FIG. 1, a computing environment 100 is depicted. Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again, depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for executing at least some of the computer code involved in performing the instant solution, such as multi-variant container image instantiation process 200. In addition to multi-variant container image instantiation process 200, computing environment 100 includes, for example, computer 101, wide area network (WAN) 102, end-user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and multi-variant container image instantiation process 200, as identified above), peripheral device set 114 (including user interface (UI), device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smartphone, smartwatch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, the performance of a computer-implemented method may be distributed among multiple computers and/or between multiple locations. On the other hand, in this presentation of the computing environment 100, a detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is a memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off-chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document. These computer readable program instructions are stored in various types of computer readable storage media, such as cache 121 and the other storage media discussed below. The program instructions, and associated data, are accessed by processor set 110 to control and direct performance of the instant solution. In computing environment 100, at least some of the instructions for performing the instant solution may be stored in block 200 in persistent storage 113.

COMMUNICATION FABRIC 111 is the signal conduction paths that allow the various components of computer 101 to communicate with each other. Typically, this fabric comprises switches and electrically conductive paths, such as the switches and electrically conductive paths that make up busses, bridges, physical input/output ports, and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read-only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open source Portable Operating System Interface type operating systems that employ a kernel. The code included in block 200 typically includes at least some of the computer code involved in performing the instant solution.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smartwatches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer, and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the instant solution can typically be downloaded to computer 101 from an external computer or external storage device through a network adapter card or network interface included in network module 115.

WAN 102 is any wide area network (for example, the internet) capable of communicating computer data over non-local distances by any technology for communicating computer data now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer, and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, this data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanations of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as communicating with WAN 102, in other embodiments, a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both parts of a larger hybrid cloud.

Figure 2:
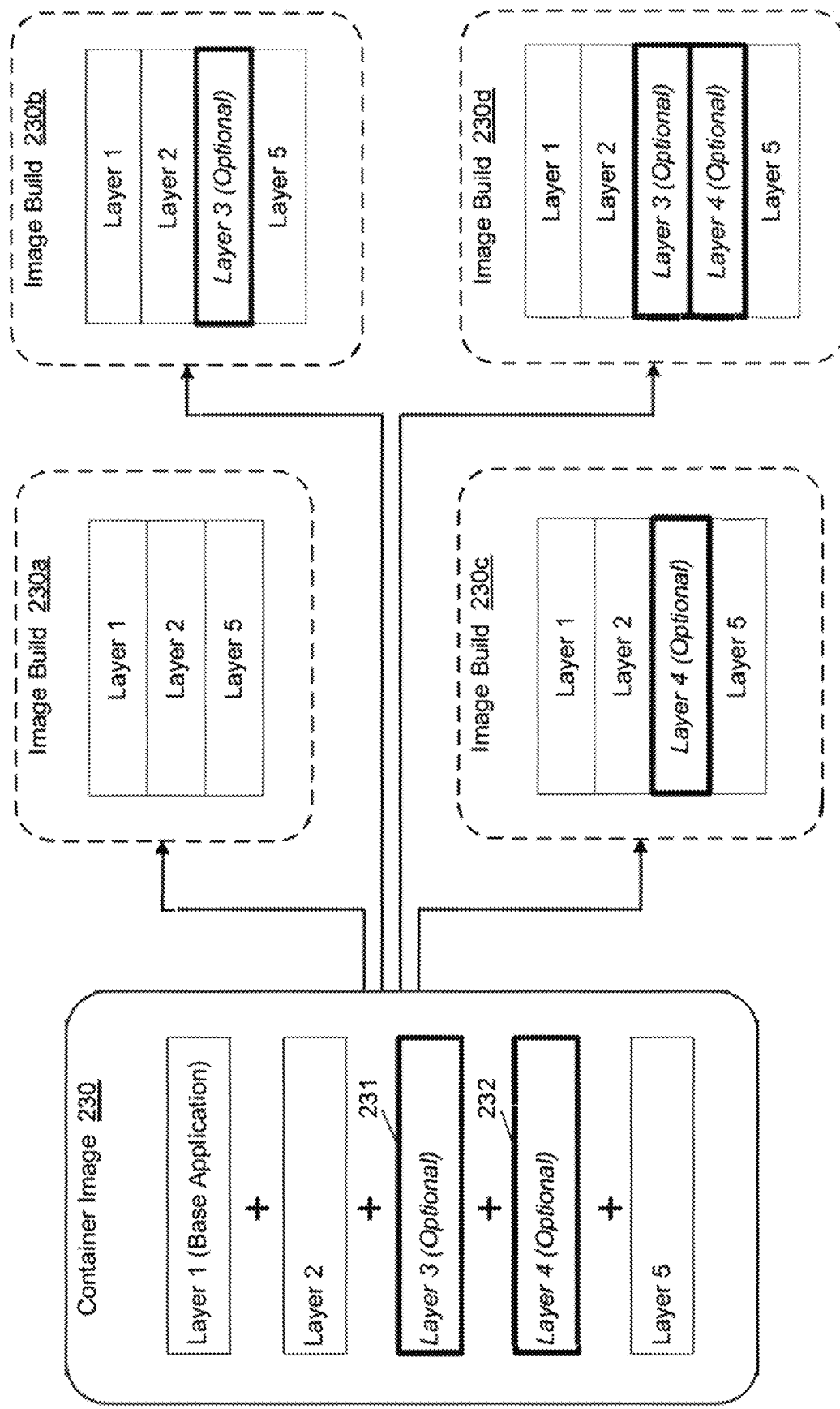
FIG. 2 is a diagram illustrating an example of a multi-variant container image, according to example embodiments.

FIG. 2 illustrates a process 220 of instantiating different variations of a container based on a multi-variant image container according to example embodiments. Layering or file layers refers to a technology used by a containerization platform such as DOCKER®. The layers are fundamental building blocks for creating, deploying, and scaling processes. The containerization process reduces the inefficiencies of software development pertaining to application dependencies, versioning issues, and other long-term maintenance efforts.

FIG. 2 illustrates an example of a "multi-variant" container image 230. Here, the container image 230 can include multiple layers. In the example of FIG. 2, the container image 230 includes five (5) image layers for of example; however, it should be appreciated that more image layers (or less) may be embodied within the container image 230. As an example, the first image layer may be the base layer of the application. Meanwhile, image layer 231 and image layer 232 are optional. As a non-limiting example, the image layer 231 may correspond to a first optional feature supported by the application (e.g., stored in the base layer). For example, the image layer 231 may correspond to the processes, libraries, and binaries for customer management and sales. Likewise, the image layer 232 may correspond to another optional feature which is supported by the application. For example, the image layer 232 may correspond to processes, libraries, and binaries for an email client application.

In this example, different variations of image layers may be pulled from the container image 230 and added to a container in a runtime environment. For example, a user may submit a request to deploy an instance of the container image 230 within a runtime environment of a host platform such as a cloud platform. In response, the host platform may launch/deploy a new instance of the container and pull image layers from the container image 230 into an image build generated from the container image 230. According to various embodiments, the user may request which optional features they are interested in and select only those features for inclusion in the final image build that is used to deploy the container and the application embodied therein.

In the example of FIG. 2, the container image 230 includes two optional image layers including image layer 231 and image layer 232. The container image may include a corresponding build file such as the build file shown in FIG. 4A. The build file can be compiled to identify which layers within the container image 230 are optional, and the tags that are assigned to each of those image layers.

However, in many cases, the user (or entity) downloading and using the container image does not need all of the features available in the container image. For example, a container may include an email service and a cloud setup service. A user downloading the container may only be interested in one of these services; however, the images are generated in advance. Thus, the user will need to download the entire image including the unwanted service when downloading the container. In the example of FIG. 2, there are four possible combinations of image builds that can be pulled from the container image 230 and integrated into a container. Each of the four different configurations include all of the "required" layers which are not optional. Meanwhile, the four different configurations also include four different configurations of the optional image layers 231 and 232 including a first final image build 230*a* without either of the image layers 231 and 232, a second final image build 230*b* with image layer 231 added but image layer 232 excluded, a third final image build 230*c* with image layer 232 included and image layer 231 excluded, and a fourth final image build 230*d* with both image layers 231 and 232 included in the final container image. For example, a request with an identifier for a "latest" version of the application corresponding to the container may be interpreted by the container engine as only the "required" layers of the container image without any of the optional layers. Thus, the container engine may deploy only the necessary layers while excluding all optional layers. Any of these final configurations may be pulled (i.e., downloaded and stored in a container) during deployment of an image build generated from the container image 230 based on tags that are embedded within the build file of the container image 230.

According to various embodiments, optional layers within an image container may be "tagged" with an OPTIONAL tag within the build file. For example, the image layer 231 may be assigned a tag id=A while the image layer 232 may be assigned a tag id=B, in the build file. To request the first image layer 231, the user may submit a request to a container registry of the container engine (e.g., via a user interface, API, etc.) which identifies the tag A (e.g., tag id=A). Likewise, to request the second image layer 232, the user may submit a request to the container registry which identifies the tag B (e.g., tag id=B). The registry may compile the build file to identify which tags correspond to which image layers. Next, the registry may exclude any optional image layers which are not requested with the tag identifier and only pull the required image layers and any optional image layers that are identified by the tag identifier.

The image layers of the container image 230 may include various features. For example, one of the first image layers within the container image may contain an operating system such as a Ubuntu operating system of a virtual machine. Another image layer or image layers within the container image may include features that are core features of the application which are not optional and which are required for the build of the final container image. One of the last images in the container image 230 may be a read/write layer for reading and writing data. In addition to these image layers, the container image 230 may include one or more optional image layers such as optional image layers 231 and 232.

The process described herein solves the aforementioned problems of the inefficiencies that occur when pulling an image build from a container image. For example, optional features within the container image may be excluded from the pulling process thereby reducing the amount of data that needs to be downloaded and executed/installed in the host environment. For example, container engine may be coupled to a registry or the like that may provide a system which can interpret a new higher order Instruction within a container image labeled as "OPTIONAL" by compiling a build file of the container image. In this optional embodiment, the optional tag included in the build file can provide an advantage because it enables the compiler which compiles the build file to identify the optional image layers prior to the system pulls the images layers down to the container thus ensuring a very efficient download. Furthermore, the optional tag can be used to exclude the image layer from the pulling process. The optional tag essentially enables each optional image layer to be mutually exclusive from one another in the final image build. The build steps that do not have any optional keywords are considered essential/non-addon and will always be included in the image when pulled from the registry.

The build file may be compiled by a compiler such as a registry to identify which image layers are optional. The registry may be customized to select only the required image layers and any optional image layers that are identified by a tag identifier in the request to be included within a final image build. The registry may transfer the tag identifier to a container engine which may push the final image to the container in the runtime environment.

Figure 3A:
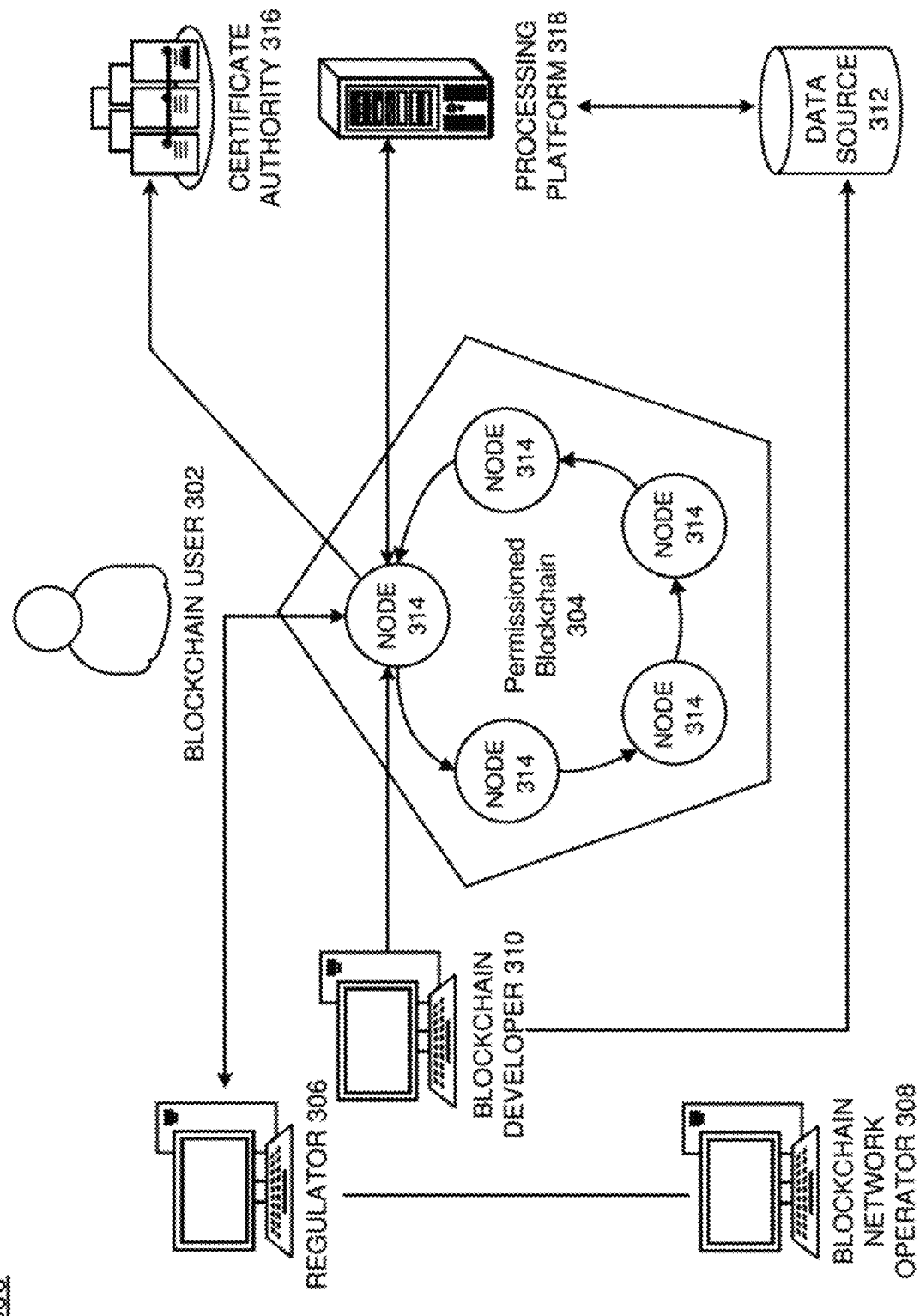
FIG. 3A is a diagram illustrating a permissioned network, according to example embodiments.

FIG. 3A illustrates an example of a permissioned blockchain network 300, which features a distributed, decentralized peer-to-peer architecture. The blockchain network may interact with the cloud computing environment 160 (shown in FIG. 3D), allowing additional functionality such as peer-to-peer authentication for data written to a distributed ledger. In this example, a blockchain user 302 may initiate a transaction to the permissioned blockchain 304. In this example, the transaction can be a deploy, invoke, or query, and may be issued through a client-side application leveraging an SDK, directly through an API, etc. Networks may provide access to a regulator 306, such as an auditor. A blockchain network operator 308 manages member permissions, such as enrolling the regulator 306 as an "auditor" and the blockchain user 302 as a "client". An auditor could be restricted only to querying the ledger, whereas a client could be authorized to deploy, invoke, and query certain types of chaincode.

A blockchain developer 310 can write chaincode and client-side applications. The blockchain developer 310 can deploy chaincode directly to the network through an interface. To include credentials from a traditional data source 312 in chaincode, the developer 310 could use an out-of-band connection to access the data. In this example, the blockchain user 302 connects to the permissioned blockchain 304 through a peer node 314. Before proceeding with any transactions, the peer node 314 retrieves the user's enrollment and transaction certificates from a certificate authority 316, which manages user roles and permissions. In some cases, blockchain users must possess these digital certificates in order to transact on the permissioned blockchain 304. Meanwhile, a user attempting to utilize chaincode may be required to verify their credentials on the traditional data source 312. To confirm the user's authorization, chaincode can use an out-of-band connection to this data through a traditional processing platform 318.

Figure 3B:
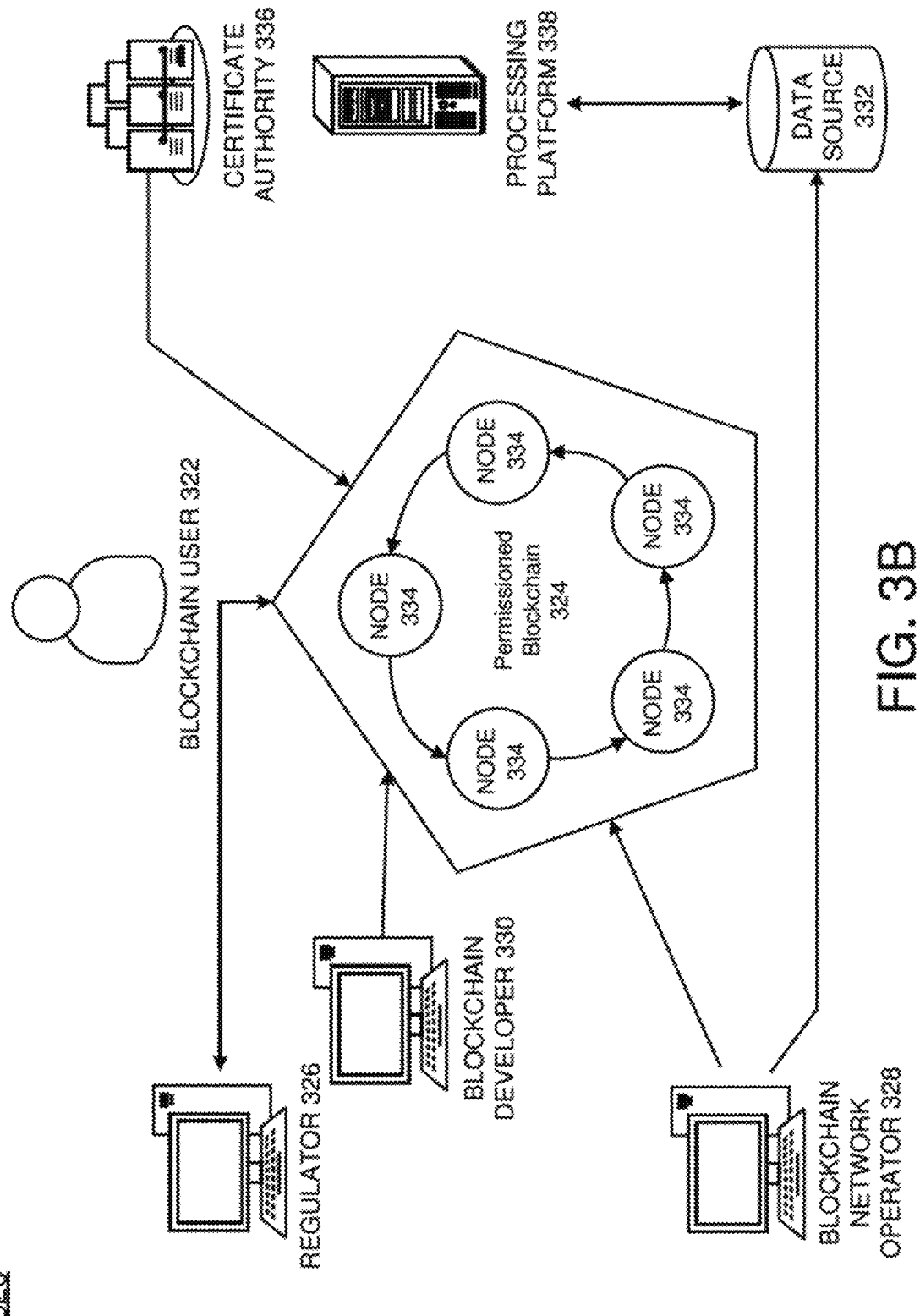
FIG. 3B is a diagram illustrating another permissioned network, according to example embodiments.

FIG. 3B illustrates another example of a permissioned blockchain network 320, which features a distributed, decentralized peer-to-peer architecture. In this example, a blockchain user 322 may submit a transaction to the permissioned blockchain 324. In this example, the transaction can be a deploy, invoke, or query, and may be issued through a client-side application leveraging an SDK, directly through an API, etc. Networks may provide access to a regulator 326, such as an auditor. A blockchain network operator 328 manages member permissions, such as enrolling the regulator 326 as an "auditor" and the blockchain user 322 as a "client". An auditor could be restricted only to querying the ledger, whereas a client could be authorized to deploy, invoke, and query certain types of chaincode.

A blockchain developer 330 writes chaincode and client-side applications. The blockchain developer 330 can deploy chaincode directly to the network through an interface. To include credentials from a traditional data source 332 in chaincode, the developer 330 could use an out-of-band connection to access the data. In this example, the blockchain user 322 connects to the network through a peer node 334. Before proceeding with any transactions, the peer node 334 retrieves the user's enrollment and transaction certificates from the certificate authority 336. In some cases, blockchain users must possess these digital certificates in order to transact on the permissioned blockchain 324. Meanwhile, a user attempting to utilize chaincode may be required to verify their credentials on the traditional data source 332. To confirm the user's authorization, chaincode can use an out-of-band connection to this data through a traditional processing platform 338.

In some embodiments, the blockchain herein may be a permissionless blockchain. In contrast with permissioned blockchains, which require permission to join, anyone can join a permissionless blockchain. For example, to join a permissionless blockchain a user may create a personal address and begin interacting with the network by submitting transactions and hence adding entries to the ledger. Additionally, all parties have the choice of running a node on the system and employing the mining protocols to help verify transactions.

Figure 3C:
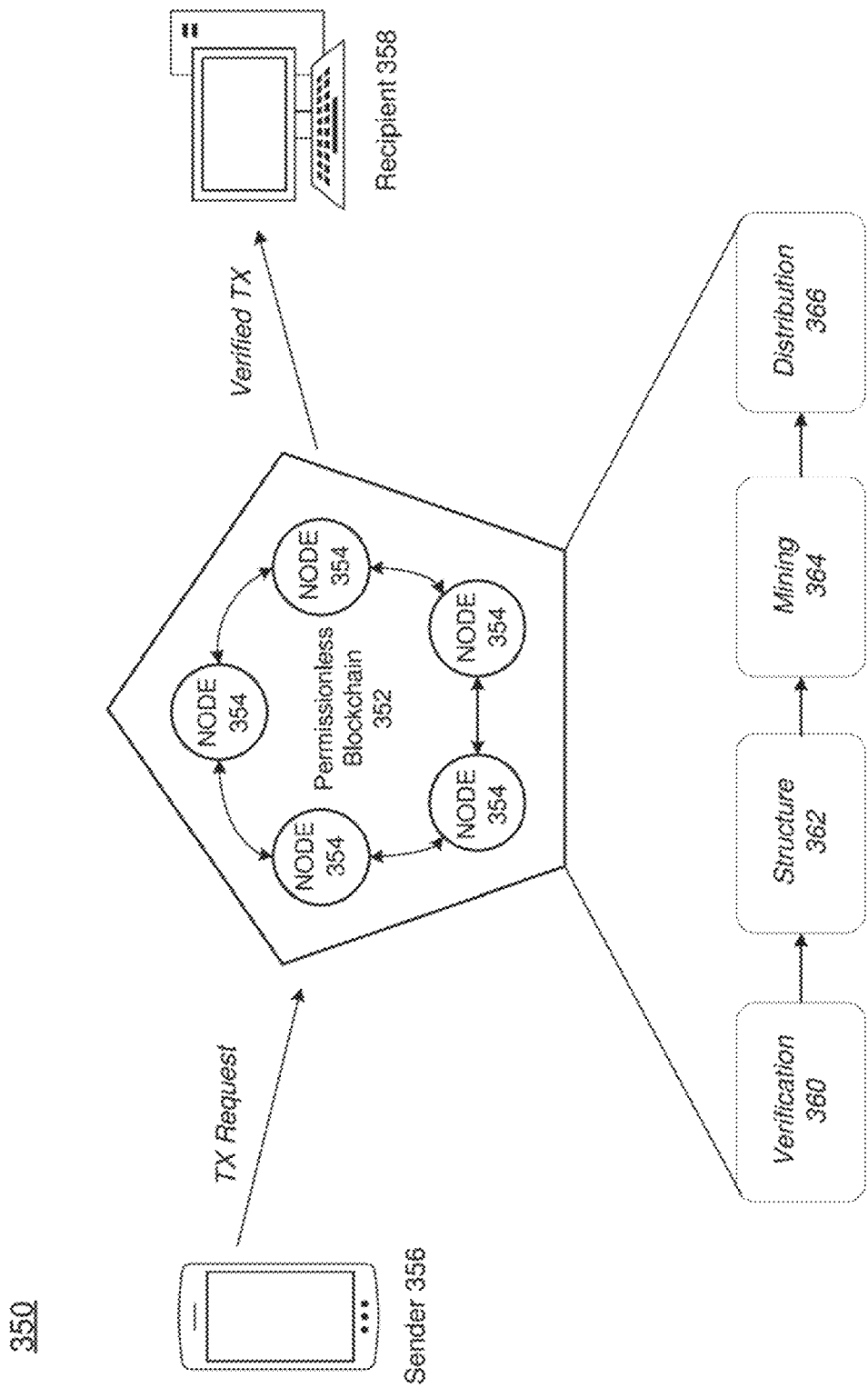
FIG. 3C is a diagram illustrating a further permissionless network, according to example embodiments.

FIG. 3C illustrates a process 350 of a transaction being processed by a permissionless blockchain 352, including a plurality of nodes 354. A sender 356 desires to send payment or some other form of value (e.g., a deed, medical records, a contract, a good, a service, or any other asset that can be encapsulated in a digital record) to a recipient 358 via the permissionless blockchain 352. In one embodiment, each of the sender device 356 and the recipient device 358 may have digital wallets (associated with the blockchain 352) that provide user interface controls and a display of transaction parameters. In response, the transaction is broadcast throughout the blockchain 352 to the nodes 354. Depending on the blockchain's 352 network parameters, the nodes verify 360 the transaction based on rules (which may be pre-defined or dynamically allocated) established by the permissionless blockchain 352 creators. For example, this may include verifying the identities of the parties involved, etc. The transaction may be verified immediately or it may be placed in a queue with other transactions, and the nodes 354 determine if the transactions are valid based on a set of network rules.

In structure 362, valid transactions are formed into a block and sealed with a lock (hash). This process may be performed by mining nodes among the nodes 354. Mining nodes may utilize additional software specifically for mining and creating blocks for the permissionless blockchain 352. Each block may be identified by a hash (e.g., 256-bit number, etc.) created using an algorithm agreed upon by the network. Each block may include a header, a pointer or reference to a hash of a previous block's header in the chain, and a group of valid transactions. The reference to the previous block's hash is associated with the creation of the secure independent chain of blocks.

Before blocks can be added to the blockchain, the blocks must be validated. Validation for the permissionless blockchain 352 may include a proof-of-work (PoW) which is a solution to a puzzle derived from the block's header. Although not shown in the example of FIG. 3C, another process for validating a block is proof-of-stake. Unlike the proof-of-work, where the algorithm rewards miners who solve mathematical problems, with the proof of stake, a creator of a new block is chosen in a deterministic way, depending on its wealth, also defined as "stake." Then, a similar proof is performed by the selected/chosen node.

With mining 364, nodes try to solve the block by making incremental changes to one variable until the solution satisfies a network-wide target. This creates the PoW, thereby ensuring correct answers. In other words, a potential solution must prove that computing resources were drained in solving the problem. In some types of permissionless blockchains, miners may be rewarded with value (e.g., coins, etc.) for correctly mining a block.

Here, the POW process, alongside the chaining of blocks, makes modifications of the blockchain extremely difficult, as an attacker must modify all subsequent blocks in order for the modifications of one block to be accepted. Furthermore, as new blocks are mined, the difficulty of modifying a block increases, and the number of subsequent blocks increases. With distribution 366, the successfully validated block is distributed through the permissionless blockchain 352, and all nodes 354 add the block to a majority chain which is the permissionless blockchain's 352 auditable ledger. Furthermore, the value in the transaction submitted by the sender 356 is deposited or otherwise transferred to the digital wallet of the recipient device 358.

Figure 3D:
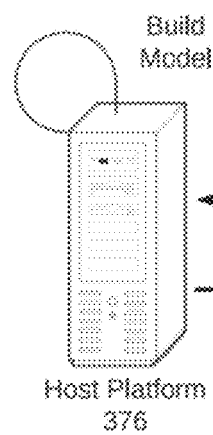
FIG. 3D is a diagram illustrating machine learning process via a cloud computing platform, according to example embodiments.
Figure 3D:
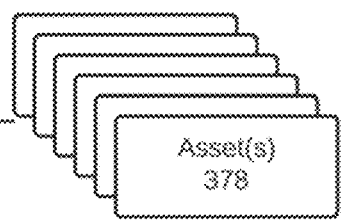
Figure 3D:
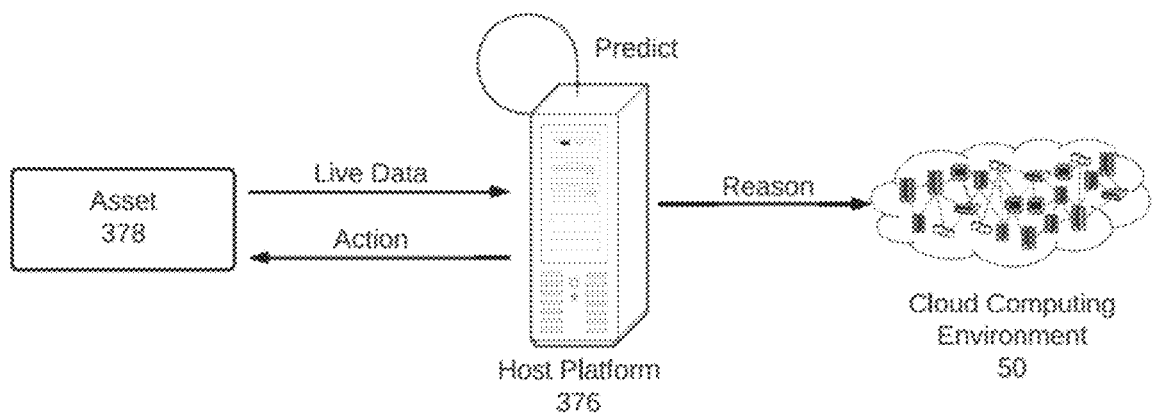
Figure 3E:
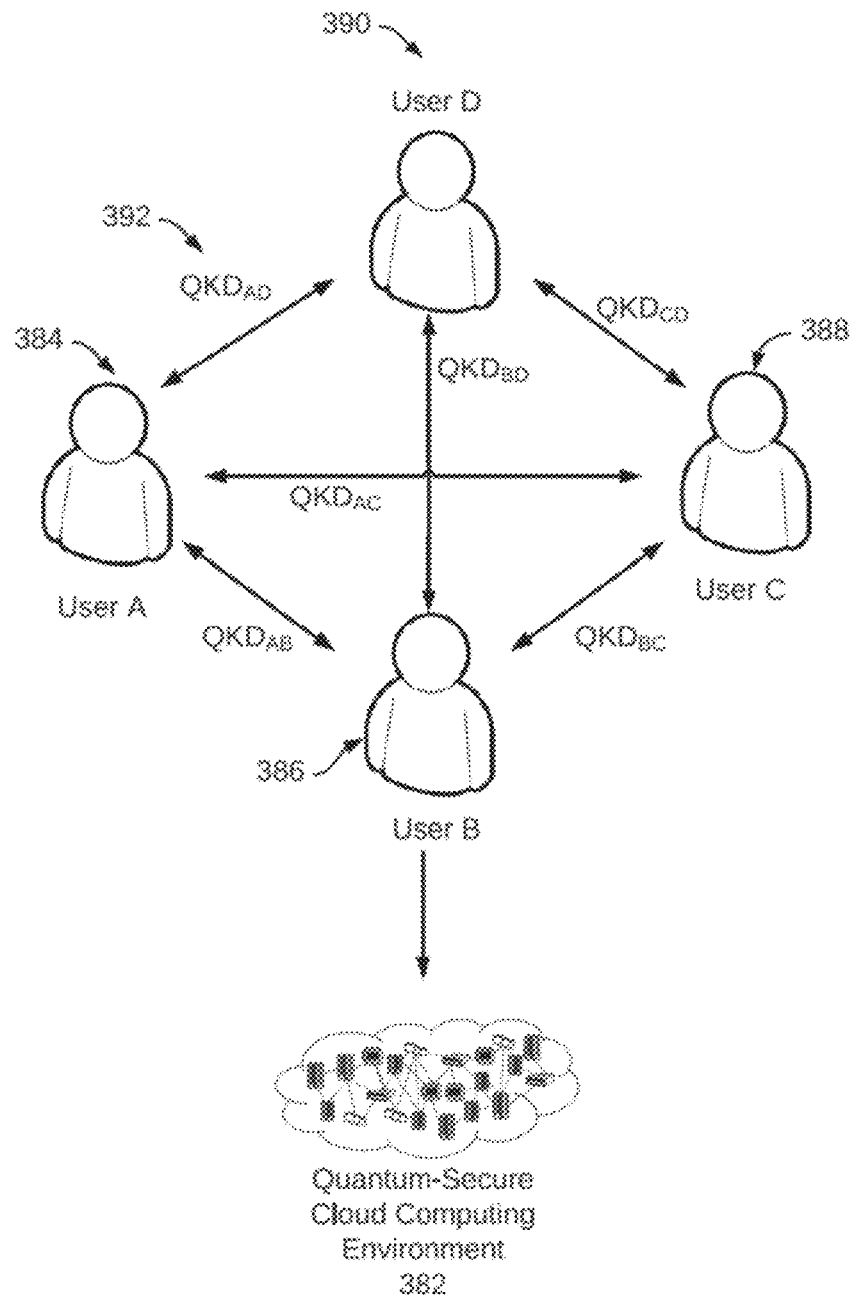
FIG. 3E is a diagram illustrating a quantum computing environment associated with a cloud computing platform, according to example embodiments.

FIGS. 3D and 3E illustrate additional examples of use cases for cloud computing that may be incorporated and used herein. FIG. 3D illustrates an example 370 of a cloud computing environment 160, which stores machine learning (artificial intelligence) data. Machine learning relies on vast quantities of historical data (or training data) to build predictive models for accurate prediction on new data. Machine learning software (e.g., neural networks, etc.) can often sift through millions of records to unearth non-intuitive patterns.

In the example of FIG. 3D, a host platform 376, builds and deploys a machine learning model for predictive monitoring of assets 378. Here, the host platform 376 may be a cloud platform, an industrial server, a web server, a personal computer, a user device, and the like. Assets 378 can be any type of asset (e.g., machine or equipment, etc.), such as an aircraft, locomotive, turbine, medical machinery and equipment, oil and gas equipment, boats, ships, vehicles, etc. As another example, assets 378 may be non-tangible assets such as stocks, currency, digital coins, insurance, or the like.

The cloud computing environment 160 can be used to significantly improve both a training process 372 of the machine learning model and a predictive process 374 based on a trained machine learning model. For example, in 372, rather than requiring a data scientist/engineer or another user to collect the data, historical data may be stored by the assets 378 themselves (or through an intermediary, not shown) on the cloud computing environment 160. This can significantly reduce the collection time needed by the host platform 376 when performing predictive model training. For example, data can be directly and reliably transferred straight from its place of origin to the cloud computing environment 160. By using the cloud computing environment 160 to ensure the security and ownership of the collected data, smart contracts may directly send the data from the assets to the individuals that use the data for building a machine learning model. This allows for sharing of data among the assets 378.

Furthermore, training of the machine learning model on the collected data may take rounds of refinement and testing by the host platform 376. Each round may be based on additional data or data that was not previously considered to help expand the knowledge of the machine learning model. In 372, the different training and testing steps (and the associated data) may be stored on the cloud computing environment 160 by the host platform 376. Each refinement of the machine learning model (e.g., changes in variables, weights, etc.) may be stored in the cloud computing environment 160 to provide verifiable proof of how the model was trained and what data was used to train the model. For example, the machine learning model may be stored on a blockchain to provide verifiable proof. Furthermore, when the host platform 376 has achieved a trained model, the resulting model may be stored on the cloud computing environment 160.

After the model has been trained, it may be deployed to a live environment where it can make predictions/decisions based on executing the final trained machine learning model. For example, in 374, the machine learning model may be used for condition-based maintenance (CBM) for an asset such as an aircraft, a wind turbine, a healthcare machine, and the like. In this example, data fed back from asset 378 may be input into the machine learning model and used to make event predictions such as failure events, error codes, and the like. Determinations made by executing the machine learning model at the host platform 376 may be stored on the cloud computing environment 160 to provide auditable/verifiable proof. As one non-limiting example, the machine learning model may predict a future breakdown/failure to a part of the asset 378 and create an alert or a notification to replace the part. The data behind this decision may be stored by the host platform 376 and/or on the cloud computing environment 160. In one embodiment, the features and/or the actions described and/or depicted herein can occur on or with respect to the cloud computing environment 160.

FIG. 3E illustrates an example 380 of a quantum-secure cloud computing environment 382, which implements quantum key distribution (QKD) to protect against a quantum computing attack. In this example, cloud computing users can verify each other's identities using QKD. This sends information using quantum particles such as photons, which cannot be copied by an eavesdropper without destroying them. In this way, a sender and a receiver through the cloud computing environment can be sure of each other's identity.

In the example of FIG. 3E, four users are present 384, 386, 388, and 390. Each pair of users may share a secret key 392 (i.e., a QKD) between themselves. Since there are four nodes in this example, six pairs of nodes exist, and therefore six different secret keys 392 are used, including QKDAB, QKDAC, QKDAD, QKDBC, QKDBD, and QKDCD. Each pair can create a QKD by sending information using quantum particles such as photons, which cannot be copied by an eavesdropper without destroying them. In this way, a pair of users can be sure of each other's identity.

The operation of the cloud computing environment 382 is based on two procedures (i) creation of transactions and (ii) construction of blocks that aggregate the new transactions. New transactions may be created similar to a traditional network, such as a blockchain network. Each transaction may contain information about a sender, a receiver, a time of creation, an amount (or value) to be transferred, a list of reference transactions that justifies the sender has funds for the operation, and the like. This transaction record is then sent to all other nodes, where it is entered into a pool of unconfirmed transactions. Here, two parties (i.e., a pair of users from among 384-390) authenticate the transaction by providing their shared secret key 392 (QKD). This quantum signature can be attached to every transaction, making it exceedingly difficult to be tampered with. Each node checks its entries with respect to a local copy of the cloud computing environment 382 to verify that each transaction has sufficient funds.

Figure 4A:
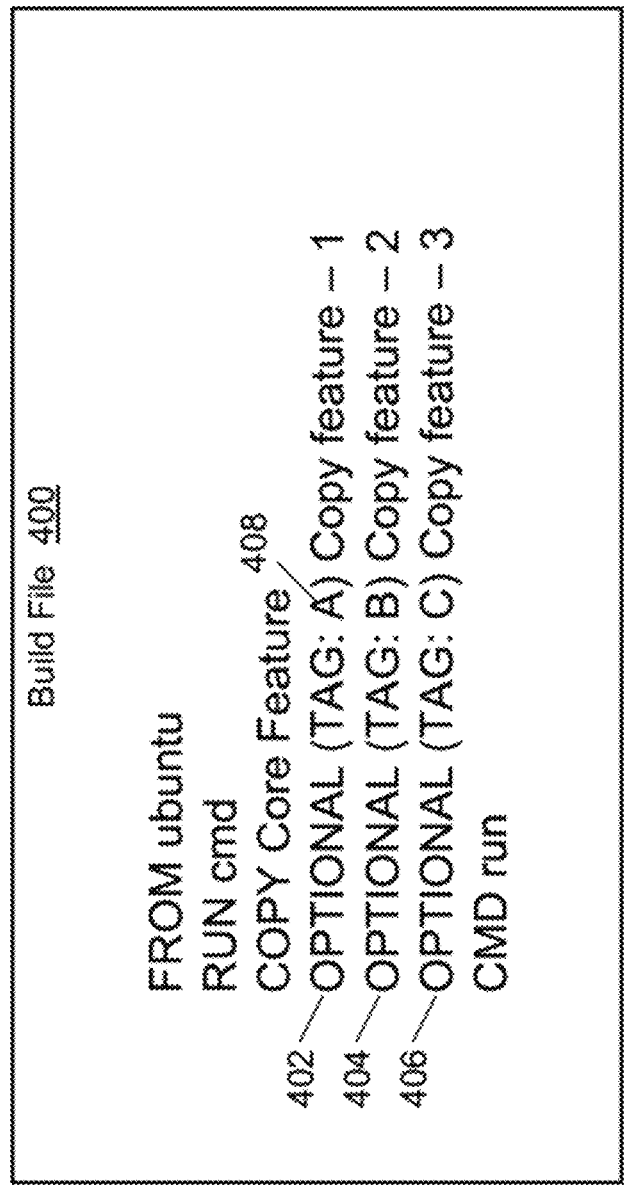
FIG. 4A is a diagram illustrating an example of a build file of a container image, according to example embodiments.

FIG. 4A illustrates an example of a build file 400 of a container image according to an example embodiment. Each line of the build file includes an instruction for building an instance of a container image. The host platform (e.g., a container engine, etc.) may compile the build file 400 to identify the image layers and tags that are assigned to the image layers. In this example, the first instruction refers to loading of an operating system (ubuntu) which is included in a first image layer. The second instruction refers to a run command for running the operating system. The third instruction refers to an instruction to load a core feature (e.g., a software application, etc.) from another layer of the container image. Meanwhile, instructions 402, 404, and 406, refer to "optional" instructions corresponding to optional image layers from within the container image. These optional image layers refer to optional features of the application associated therewith which may be included in the "core feature".

Each optional instruction and corresponding optional layer may be identified with a tag inside of the build file when the build file is compiled. For example, the instruction 402 includes a tag identifier 408 that recites the name "TAG A" and an "OPTIONAL" marker indicating that the instruction 402 corresponds to an optional layer within the container image. The other optional features may also include a tag identifier 408 and an "OPTIONAL" marker. In this example, the optional features are labeled with tag identifiers 'TAG: A', 'TAG: B', and 'TAG: C', respectively. Any type of identifiers may be used to label the tags. Also, the "OPTIONAL" identifier may be embedded within the instructions to further indicate that the instructions are optional.

Figure 4B:
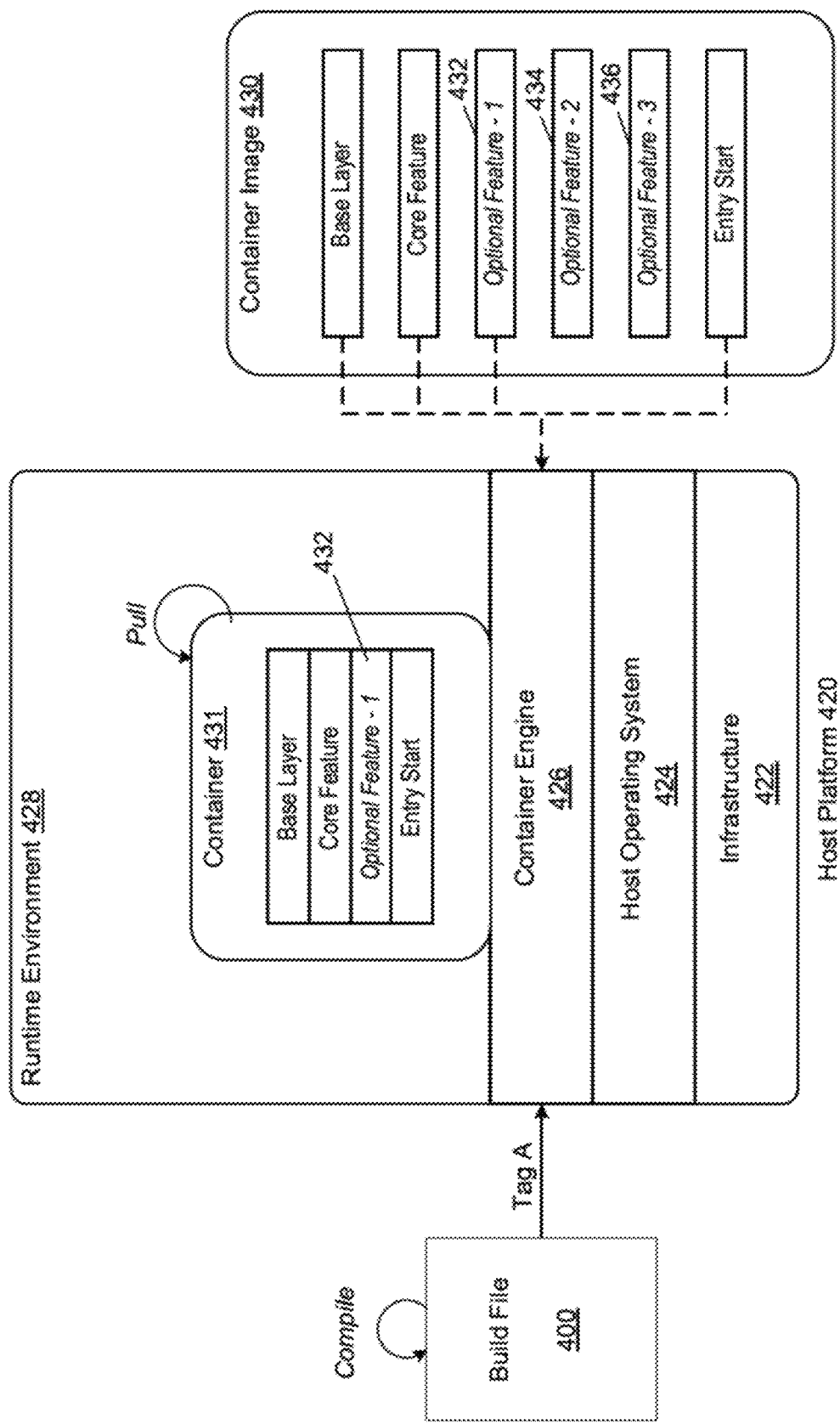
FIG. 4B is a diagram illustrating an example of pulling an instance of a container image based on optional image layers, according to example embodiments.

FIG. 4B illustrates a process 410 of pulling an image build of a container image 430 based on execution of the build file 400 shown in FIG. 4A, according to an example embodiment. Container images may be stored in a repository (not shown) and pulled/deployed upon request from a user or a software program such an application programming interface (API) of the host platform 420, a user interface associated with the host platform 420, or the like. In the example of FIG. 4B, a container image 430 comprises a plurality of image layers corresponding to the plurality of instructions within the build file 400 shown in FIG. 4A. In this example, the container image 430 includes three optional layers including optional layer 432 corresponding to the instruction 402 in the build file 400, optional layer 434 corresponding to the instruction 404 in the build file 400, and optional layer 436 corresponding to the instruction 406 in the build file 400.

According to various embodiments, a host platform 420 may include a containerization platform that includes infrastructure 422 such as hardware, virtual machines, servers, cloud platforms, and the like. The host platform 420 may also include a host operating system 424 and a container engine 426. The container engine 426 may run multiple instances of the container image 430 within a runtime environment 428 thereof. For example, the container engine 426 may include a service (e.g., a daemon) that is responsible for pulling content from the container image 430 to generate a final container image, and then deploying the final container image within the runtime environment 428.

In response to a request for an image build from the container image 430, the host platform 420 may generate the container image 430, including all the layers therein. The host platform may start with the entire container image 430 built therein. Next, the build file 400 may be compiled to identify which optional layers of the container image 430 are to be included in the final image build. In particular, the compiling may identify a tag identifier corresponding to which optional layers to include. For example, based on a manifest, a registry may know that TAG A requires the optional image layer 432, and will only pull the required image layers and the optional image layer 432. The manifest may be stored with the container image 430. When the build file is compiled, the host platform can create a manifest with different tag options. For example, a custom build file can define TAG A, TAG C, TAG E, etc. Then, the different image layers may be assigned different tags. The original image and the manifest file will be downloaded by deployment.

In this example, the host platform compiles the build file 400 and identifies that the optional image layers corresponding to TAG A should be included in the final image build. The TAG A identifier may be fed to the container engine 426 via a request such as an API call or a user interface selection. In response, the container engine 426 pulls the required image layers and the optional image layer 432 into a final build which is then loaded into a container 431 in the runtime environment 428. However, the optional image layers 434 and 436 are not identified from the request and are therefore excluded from the final build of the container.

FIG. 4C illustrates another example of a build file 440 of the container image 430 according to an example embodiment. In this example, the build file 440 includes the same set of instructions (442, 444 and 446) as the build file 400 shown in FIG. 4A. However, in this example, an additional tag identifier 448 is added (TAG: D). Here, a single tag identifier (TAG: D) is used to identify two different image layers using two different sub-tags 448a and 448b that are added to two different instructions 442 and 446.

Figure 4D:
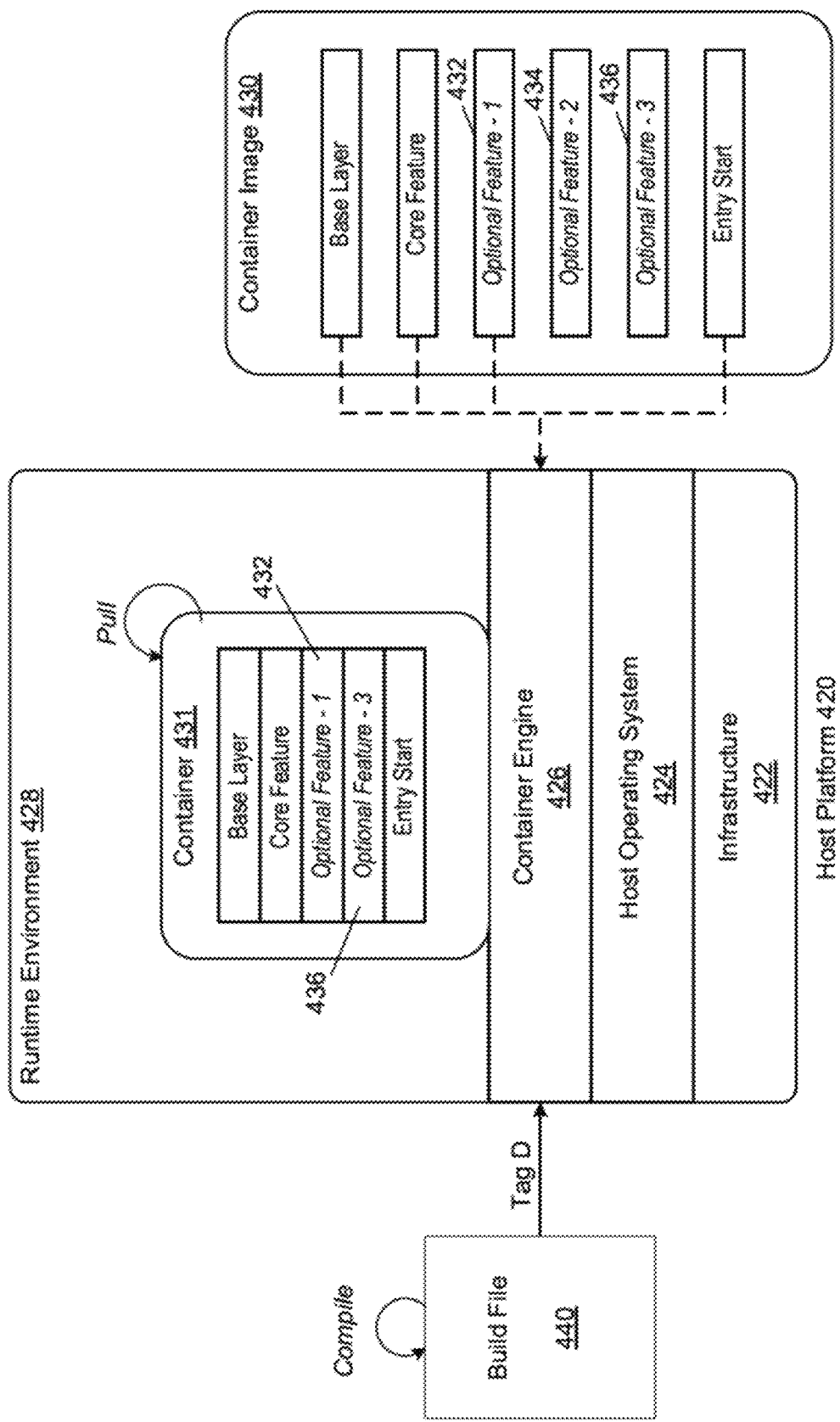
FIG. 4D is a diagram illustrating another example of pulling an instance of a container image based on optional image layers, according to example embodiments.

FIG. 4D illustrates another example process 450 of pulling an instance of the container image 430 based on compiling the build file 440 shown in FIG. 4C, according to an example embodiment. Referring to FIG. 4D, the host platform 420 receives a request to initiate a new instance of the container image 430. Here, the request may include a different tag identifier (TAG D). In response, the host platform compiles the build file 440 to identify the TAG D and forward the TAG D to the container engine 426. The container engine 426 creates the final image build which includes the required image layers from the container image 430 and the optional image layers 432, 434, and 436 corresponding to the two sub-tags 448a and 448b. Thus, a single tag identifier can be used to identify multiple optional image layers that are to be added to a final image build.

According to various embodiments, a host platform 420 may include a containerization platform that includes infrastructure 422 such as hardware, virtual machines, servers, cloud platforms, and the like. The host platform 420 may also include a host operating system 424 and a container engine 426. The container engine 426 may run multiple instances of the container image 430 within a runtime environment 428 thereof.

FIG. 5 illustrates a method 500 of building an instance of a container image with one or more optional layers removed according to an example embodiment. For example, the method may be performed by a host such as a cloud platform or other host system such as a web server, a database, a distributed network of systems, and the like. Referring to FIG. 5, in 510, the method may include receiving a request to build an instance of a container image that comprises a plurality of image layers, wherein the request comprises a tag identifier. The request may include an API request/call, a user interface request/submission, or the like.

In 520, the method may include creating the container image comprising the plurality of image layers. In 530, the method may include identifying a subset of image layers from among the plurality of image layers within the container image to exclude based on the tag identifier. In 540, the method may include pulling remaining image layers from the container image with the subset of image layers excluded therefrom to an instance of a container deployed in a runtime environment.

In some embodiments, the container image may include one or more image layers within the container image that are optional and one or more tag identifiers assigned to the one or more image layers within a build file, respectively. In some embodiments, the method may further include compiling the build file to identify which image layers within the container image are optional and tag identifiers assigned to the image layers which are optional, respectively. In some embodiments, the identifying may include identifying an optional image layer within the container image that is to be excluded from the pulling in response to a tag identifier assigned to the optional image layer not being present in the tag identifier in the request.

In some embodiments, the container image may include a plurality of image layers therewithin that are optional and a plurality of tag identifiers assigned to the plurality of image layers, respectively. In some embodiments, the pulling may include pulling only required image layers to the container in the runtime environment in response to a predefined tag identifier being included in the request. In some embodiments, the pulling may include pulling one or more optional image layers from the container image to the instance of the container in response to a predefined tag identifier being included in the request.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application-specific integrated circuit ("ASIC"). In the alternative, the processor and the storage medium may reside as discrete components.

Although an exemplary embodiment of at least one of a system, method, and computer readable medium has been illustrated in the accompanying drawings and described in the foregoing detailed description, it will be understood that the application is not limited to the embodiments disclosed but is capable of numerous rearrangements, modifications, and substitutions as set forth and defined by the following claims. For example, the system's capabilities of the various figures can be performed by one or more of the modules or components described herein or in a distributed architecture and may include a transmitter, receiver, or pair of both. For example, all or part of the functionality performed by the individual modules may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via a plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone, or any other suitable computing device, or combination of devices. Presenting the above-described functions as being performed by a "system" is not intended to limit the scope of the present application in any way but is intended to provide one example of many embodiments. Indeed, methods, systems, and apparatuses disclosed herein may be implemented in localized and distributed forms consistent with computing technology.

It should be noted that some of the system features described in this specification have been presented as modules in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like. A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction or many instructions and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations, including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order and/or with hardware elements in configurations that are different from those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only, and the scope of the application is to be defined solely by the appended claims when considered with a full range of equivalents and modifications (e.g., protocols, hardware devices, software platforms, etc.) thereto.

What is claimed is:

1. An apparatus, comprising:
a processor that, when executing instructions stored in a memory, is configured to:
receive a request to build an instance of a container image that comprises a plurality of image layers, wherein
the plurality of image layers comprises a plurality of required image layers and one or more optional image layers,
functionality of each of the one or more optional image layers is different from functionality of each of the plurality of required image layers,
functionality of each of the one or more optional image layers is unique,
a first image layer of the plurality of required image layers provides a functionality related to an operating system of a virtual machine,
a second image layer of the plurality of required image layers provides a functionality related to a core feature of an application,
the request comprises a tag identifier, and
the instance of the container image comprises a build file comprising:
a first software instruction to load the operating system of the virtual machine included in the first image layer of the plurality of required image layers;
a second software instruction to run the loaded operating system of the virtual machine;
a third software instruction to load the core feature of the application from the second image layer of the plurality of required image layers; and
one or more tags corresponding to the one or more optional image layers; control a compiler to compile the build file, wherein the compilation of the build file:
associates each of the one or more optional image layers with a corresponding tag, of the one or more tags, that identifies each of the one or more optional image layers as optional, and
generates a manifest that shows the association between each of the one or more optional image layers and the corresponding tag;
build the instance of the container image based on the request and the manifest;
identify, based on a match of the tag identifier in the request to the corresponding tag of at least a first optional image layer of the one or more optional image layers, the at least first optional image layer of the one or more optional image layers for a new instance of the container image deployed in a runtime environment; and
pull, from the container image, a subset of the plurality of image layers to the new instance of the container image, wherein
the subset of the plurality of image layers includes the plurality of required image layers and the identified at least first optional image layer of the one or more optional image layers, and
the subset of the plurality of image layers excludes a second optional image layer of the one or more optional image layers having a tag, of the one or more tags, that does not match the tag identifier.

2. The apparatus of claim 1, wherein the request comprises a user selection of an optional feature to include in the new instance of the container image.

3. The apparatus of claim 1, wherein the processor is further configured to: always identify the at least first optional image layer, of the plurality of optional image layers, that does not have the corresponding tag as required for the new instance of the container image.

4. A method, comprising:
receiving a request to build an instance of a container image that comprises a plurality of image layers, wherein
the plurality of image layers comprises a plurality of required image layers and one or more optional image layers,
functionality of each of the one or more optional image layers is different from functionality of each of the plurality of required image layers,
functionality of each of the one or more optional image layers is unique,
a first image layer of the plurality of required image layers provides a functionality related to an operating system of a virtual machine,
a second image layer of the plurality of required image layers provides a functionality related to a core feature of an application,
the request comprises a tag identifier, and
the instance of the container image comprises a build file comprising:
a first software instruction to load the operating system of the virtual machine included in the first image layer of the plurality of required image layers;
a second software instruction to run the loaded operating system of the virtual machine;

a third software instruction to load the core feature of the application from the second image layer of the plurality of required image layers; and
one or more tags corresponding to the one or more optional image layers;
controlling a compiler to compile the build file, wherein the compilation of the build file:
associates each of the one or more optional image layers with a corresponding tag of the one or more tags that identifies each of the one or more optional image layers as optional, and
generates a manifest showing the association between each of the one or more optional image layers and the corresponding tag;
building the instance of the container image based on the request and the manifest;
identifying, based on matching the tag identifier in the request to the corresponding tag of at least a first optional image layer of the one or more optional image layers, the at least first optional image layer of the one or more optional image layers for a new instance of the container image deployed in a runtime environment; and
pulling, from the container image, a subset of the plurality of image layers to the new instance of the container image, wherein
the subset of the plurality of image layers includes the plurality of required image layers and the identified at least first optional image layer of the one or more optional image layers, and
the subset of the plurality of image layers excludes a second optional image layer of the one or more optional image layers having a tag, of the one or more tags, that does not match the tag identifier.

5. The method of claim 4, wherein the request comprises a user selection of an optional feature to include in the new instance of the container image.

6. The method of claim 4, further comprising:
always identifying the at least first optional image layer, of the plurality of optional image layers, that does not have the corresponding tag as required for the new instance of the container image.

7. A computer-readable storage medium comprising instructions that, when executed by a processor, cause the processor to perform:
receiving a request to build an instance of a container image that comprises a plurality of image layers, wherein
the plurality of image layers that comprises a plurality of required image layers and one or more optional image layers,
functionality of each of the one or more optional image layers is different from functionality of each of the plurality of required image layers,
functionality of each of the one or more optional image layers is unique,
a first image layer of the plurality of required image layers provides a functionality related to an operating system of a virtual machine,
a second image layer of the plurality of required image layers provides a functionality related to a core feature of an application,
the request comprises a tag identifier, and
the instance of the container image comprises a build file comprising:
a first software instruction to load the operating system of the virtual machine included in the first image layer of the plurality of required image layers;
a second software instruction to run the loaded operating system of the virtual machine;
a third software instruction to load the core feature of the application from the second image layer of the plurality of required image layers; and
one or more tags corresponding to the one or more optional image layers;
controlling a compiler to compile the build file, wherein the compilation of the build file:
associates each of the one or more optional image layers with a corresponding tag of the one or more tags that identifies each of the one or more optional image layers as optional, and
generates a manifest showing the association between each of the one or more optional image layers and the corresponding tag;
building the instance of the container image based on the request and the manifest;
identifying, based on matching the tag identifier in the request to the corresponding tag of at least a first optional image layer of the one or more optional image layers, the at least first optional image layer of the one or more optional image layers for a new instance of the container image deployed in a runtime environment; and
pulling, from the container image, a subset of the plurality of image layers to the new instance of the container image, wherein
the subset of the plurality of image layers includes the plurality of required image layers and the identified at least first optional image layer of the one or more optional image layers, and
the subset of the plurality of image layers excludes a second optional image layer of the one or more optional image layers having a tag, of the one or more tags, that does not match the tag identifier.

8. The computer-readable storage medium of claim 7, wherein the request comprises a user selection of an optional feature to include in the new instance of the container image.

9. The computer-readable storage medium of claim 7, wherein the instructions further cause the processor to perform:
always identifying the at least first optional image layer, of the plurality of optional image layers, that does not have the corresponding tag as required for the new instance of the container image.

* * * * *